J. M. Albertson
Hay Press.
Nº 84,982. Patented Dec. 15, 1868.
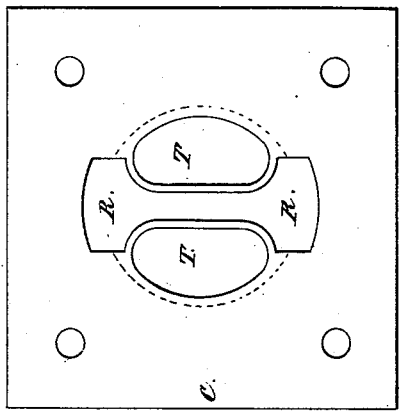
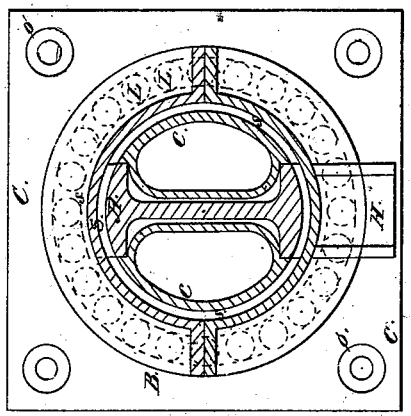
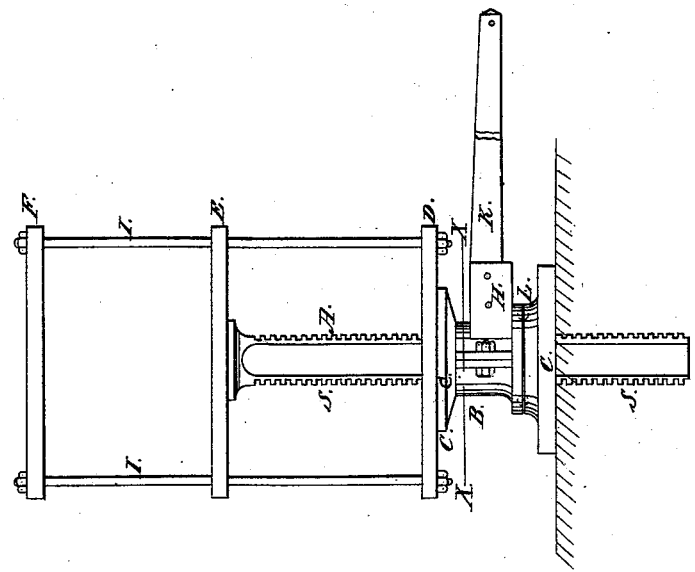
Witnesses:
H. S. Crocker
A. S. Douglass
Inventor:
Jas. M. Albertson

UNITED STATES PATENT OFFICE.

JAMES M. ALBERTSON, OF NEW LONDON, CONNECTICUT.

*Letters Patent No. 84,982, dated December 15, 1868.*

IMPROVEMENT IN BALING-PRESSES.

The Schedule referred to in these Letters Patent and making part of the same.

Be it known that I, JAMES M. ALBERTSON, of the town and county of New London, State of Connecticut, have invented a new and useful Improvement in Screw Baling-Presses, and that the following is a full, clear, and exact description of the same, reference being had to the accompanying drawings, forming a part of this specification, in which—

Figure 1 is a vertical view,

Figure 2, a cross-section, and

Figure 3, a top view of what is called the pedestal of the press, and its combinations.

Like letters refer to like parts.

The improvement consists in the adaptation of a segmental screw to the working of baling-presses in the manner herein described and shown.

In all the drawings, C represents a pedestal composed of two plates, suitably connected together.

The portions connecting these plates have their outside surfaces of such form as to adapt them to the revolution about them of the nut B, which nut depends entirely on the pedestal for support in every direction, while it is being revolved about it.

Through the plates and body of this pedestal is a space, R, of suitable form, and intended for the reception and passage of the segmental screw A, which is formed of two or more segments of a screw, either cast together or united in any suitable way, and forming, with each other, a continuous screw. The diameter of the bottom of the thread of this screw is the same as or a little less than the body of the pedestal, so that the screw-thread projects beyond the surface on which the nut B revolves, and engages its thread with that of the nut.

The operation of the whole is as follows:

The segmental screw A is placed in the recess or space R of the pedestal C, and the nut B surrounds the whole, and when the nut turns, the screw moves up and down; the screw being prevented from turning, by the sides of the space R.

The advantages of the improvement are these:

The ordinary screw, in which the thread is continued entirely around a cylindrical shaft, in order to accommodate a heavy pitch of, say, from five to ten inches, becomes so large and heavy that its use is impracticable, and as the thread is very heavy with so large a pitch, a portion of it has ample strength to do its work. By adopting the segmental screw in connection with the pedestal, the screw can be made very light, as it receives no twist, being firmly held by the pedestal at the point where the power of the nut is received by the screw, and the only strain the screw receives is in the direction of its length.

The platen of the press is also relieved from friction in passing up and down the press-box.

The whole combination may be placed either on the top of the press-box, and press downwards, or on the bottom of the press-box, and press upwards. In either case the levers are always at the same height while working.

A lighter press-box can be used with this screw than with the common round screw.

I do not claim, in this specification, the pedestal C as a means of supporting the press.

Having thus described my invention,

What I claim, and wish to secure by Letters Patent, is—

The pedestal C, formed of two plates, connected together, and provided with spaces for the segmental screw A to pass through, the whole surrounded by the revolving nut B, all arranged and operating substantially as herein set forth.

J. M. ALBERTSON.

Witnesses:
F. J. CROCKER,
A. L. DOUGLASS.